United States Patent [19]

Park

[11] Patent Number: 4,764,671

[45] Date of Patent: Aug. 16, 1988

[54] FIBER OPTIC FLUID SENSOR USING COATED SENSOR TIP

[75] Inventor: Eric D. Park, Blacksburg, Va.

[73] Assignee: Kollmorgen Corporation, Simsbury, Conn.

[21] Appl. No.: 915,159

[22] Filed: Oct. 3, 1986

[51] Int. Cl.$^4$ ............................................. G01N 15/06
[52] U.S. Cl. .................................... 250/227; 250/577
[58] Field of Search ................... 250/227, 231 R, 577; 73/293; 328/4; 356/133-137

[56] References Cited

U.S. PATENT DOCUMENTS

| | | | |
|---|---|---|---|
| 3,998,591 | 12/1976 | Eckfeldt | 350/96 R |
| 4,155,013 | 5/1979 | Spiteri | 250/577 |
| 4,197,459 | 4/1980 | Perren | 250/341 |
| 4,354,180 | 10/1982 | Harding | 250/577 |
| 4,468,567 | 8/1984 | Sasano et al. | 250/577 |
| 4,606,226 | 8/1986 | Krohn | 340/619 |
| 4,713,552 | 12/1987 | Denis | 250/577 |

FOREIGN PATENT DOCUMENTS

| | | |
|---|---|---|
| 3328141 | 2/1985 | Denmark . |
| 124415 | 4/1984 | European Pat. Off. . |
| 194732 | 3/1986 | European Pat. Off. . |
| 859104 | 1/1961 | United Kingdom . |
| 906609 | 9/1962 | United Kingdom . |
| 1508085 | 4/1978 | United Kingdom . |
| 1602614 | 2/1981 | United Kingdom . |
| 1600101 | 10/1981 | United Kingdom . |

Primary Examiner—David C. Nelms
Assistant Examiner—Stephone B. Allen
Attorney, Agent, or Firm—Morgan & Finnegan

[57] ABSTRACT

An optical fluid sensing apparatus comprising a sensing tip having a conical configuration with a coating, such as a thin layer of polytetrafluoroethylene (PTFE), on the outer surface of the tip element itself. At the sensing tip, emitted light is either refracted back into a detector fiber optic cable or is lost, depending upon the relationship between the indices of refraction of the sensing tip and coating to the substance surrounding the sensing tip, i.e. the fluid or air being sensed. In order to obtain the proper relationship between the sensing tip and the fluid, the index of refraction and the bevel angle of the tip element are carefully selected in relation to the indices of refraction of the coating and the fluid to be sensed. As a result, when fluid surrounds the tip light is dispersed into the fluid and lost. When no fluid is present, however, the coating sheds any remaining fluid and the light is internally reflected and refracted back into the detector fiber optic cable. Light reflected and refracted back into the detector fiber optic cable is carried by a return fiber cable to a photodetector for sensing and signal processing.

15 Claims, 1 Drawing Sheet

FIBER OPTIC FLUID SENSOR USING COATED SENSOR TIP

TECHNICAL FIELD

The present invention relates to a fiber optic sensing device for sensing the presence, level and/or nature of fluids.

BACKGROUND AND OBJECTS OF THE INVENTION

It is often necessary or desirable to sense the presence, level or other characteristics of fluids. Thus, it is known to use sensors with storage tanks, reservoirs, fuel tanks and pipelines to determine fluid level, conditions of overfill or underfill, or to detect contamination. For example, sensors are used in gasoline storage tanks at service stations to monitor fluid level and to detect contamination in the outer water jacket now commonly installed around such fuel tanks.

Heretofore known sensors rely upon a variety of principles to measure the fluid level and other characteristics. The most common type of sensor is the capacitance type sensor. Unfortunately, these sensors require electrical power at the sensing location, creating a hazard of explosion when volatile fluids are being sensed. Optical sensors also have electrical components in the sensing zone and, thus, suffer from the same explosion hazard. In addition, prior optical sensors have been known to give false indications due to fluids adhering to optical surfaces.

Therefore, it is an object of the present invention to provide a fluid sensing device capable of performing various sensing functions without presenting any hazard of explosion.

Another object of the present invention is to provide a remote fluid sensor in which all electrical components are positioned away from the sensing zone.

Yet another object of the present invention is to provide a remote optical sensor which does not suffer from the undesirable effects of fluid films forming at the optical sensing tip.

Another object of the invention is to provide an optical fluid sensor in which the performance of the sensor components is monitored and a separate output signal provided to indicate failure of any components.

These and other highly desirable and unusual results are accomplished by the present invention in an economical structure in which all electrical components are disposed away from the sensing zone with only a non-electrical sensing tip in contact with the fluid in the sensing zone.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps, and improvements herein shown and described.

SUMMARY OF THE INVENTION

In accordance with the present invention an optical fluid sensor is provided which detects the presence, level, or nature of fluids at a sensing tip by means of optical index of refraction matching between the sensing tip and the fluid.

Advantageously, the present invention provides optical sensing at a location remote from the optical emitter, photodetector and associated electronic signal processing equipment. This remarkable advantage is accomplished by providing fiber optic transmission cables between the sensor tip and the emitter and photodetector.

In the sensor according to the present invention, light is emitted from a semiconductor light source coupled to an emitter optical fiber, travels through the emitter fiber optic line and is incident on the rear of the sensing tip. The term "light" is used herein for convenience, but should not be construed as limiting the present invention to operation within the visible spectrum. Indeed, non-visibe radiation including infra-red radiation may prove useful and/or desirable.

Preferably, the sensing tip has a conical configuration with a coating, such as a thin layer of polytetrafluoroethylene (PTFE), on the outer surface of the tip element itself. At the sensing tip, emitted light is either refracted back into a detector fiber optic cable or is lost, depending upon the relationship between the indices of refraction of the sensing tip and coating to the substance surrounding the sensing tip, i.e. the fluid or air being sensed. In order to obtain the proper relationship between the sensing tip and the fluid, the index of refraction and the bevel angle of the tip element are carefully selected in relation to the indices of refraction of the coating and the fluid to be sensed. As a result, when fluid surrounds the tip light is dispersed into the fluid and lost. When no fluid is present, however, the coating sheds any remaining fluid and the light is internally reflected and refracted back into the detector fiber optic cable. Light reflected and refracted back into the detector fiber optic cable is carried by a return fiber cable to a photodetector for sensing and signal processing.

In addition, it has been found that a low level of light is always returned the photodetector under all conditions. Remarkably, this low level light can be used to monitor the condition of the sensor. For example, in the absence of this constant low level signal a status output can be triggered to indicate that a failure has occurred somewhere in the sensor.

Thus, it can be readily appreciated that the present invention provides a sensor capable of determining fluid level or differentiating between fluids based upon the respective indices of refraction of the sensing tip and the fluid(s) being detected.

As a further advantage of the present invention this sensing capability is provided without any need for electrical components in the sensing zone, thereby eliminating the serious hazards of explosion which can otherwise occur during the sensing of volatile fluids.

Yet a further remarkable advantage of the present invention is that the sensing tip coating reduces the undesirable effects of false readings caused by fluid films formed over the sensor tip.

In addition, the present invention advantageously provides a system fault detector by virtue of the constant monitoring of low-level light returned to the photodetector under all operating conditions.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate preferred embodiments of the product of the present invention, and together with the description serve to explain the principles of the invention, in which.

DETAILED DESCRIPTION OF THE PREFERRED EMBODIMENTS

Figure 1:
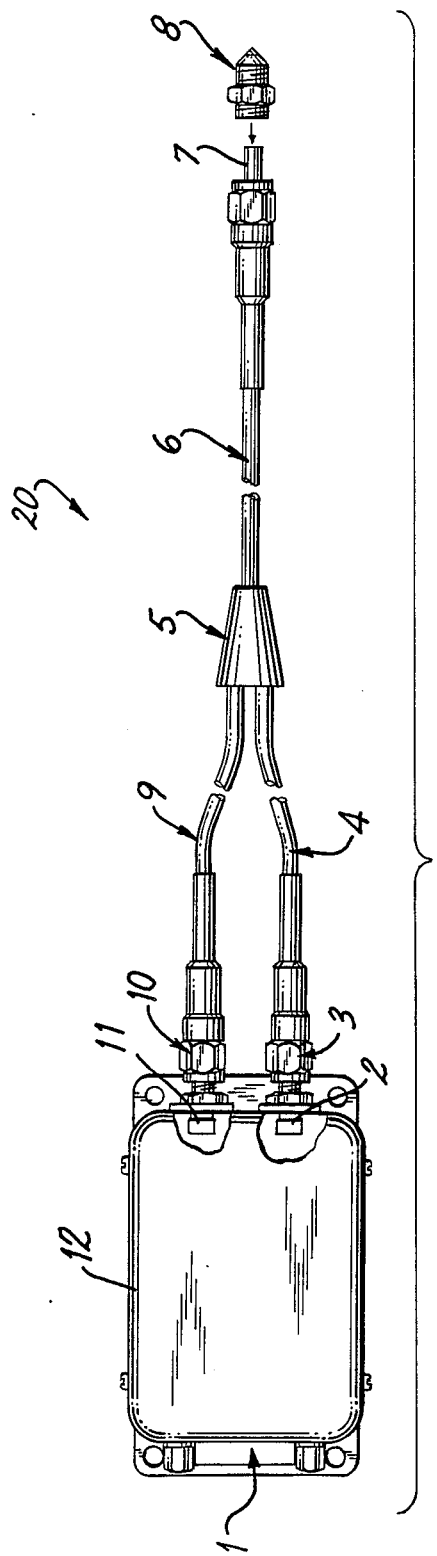
FIG. 1 is a top plan view of a preferred embodiment of the invention.

Referring now to the attached drawings, there is shown a preferred embodiment of the remote optical sensor constructed in accordance with the present invention. In FIG. 1, the fluid sensor according to the invention is generally designated by numeral 20. Fluid sensor 20 includes an electronics module 12 connected to a power source at electrical connector 1. The electrical power is regulated to provide a constant current to a semiconductor emitter 2, which emits light through an emitter optical connector 3 into a sending fiber cable 4. Sending fiber cable 4 cojoins with return fiber cable 9 at a bifurcation encapsulation 5 to form a fiber cable 6. By way of example only, fiber optic bundles, a duplex pair of fibers or a single fiber provided with a splitter may be used to provide the sending and return fiber optic pathways. The choice among these transmission media is governed by such factors as the required transmission distance, optical efficiency, and particular installation requirements.

Sending fiber cable 4 is coupled to a sensing tip 8 by a sensing tip optical connector 7. Sensing tip 8 is installed at the sensing location in contact with the fluid to be sensed. Return optical energy from sensing tip 8 travels through fiber cable 6 and return fiber 9 through a detection optical connector 10 to a photodetector 11, where the return signal is detected and electronically processed.

Figure 2:
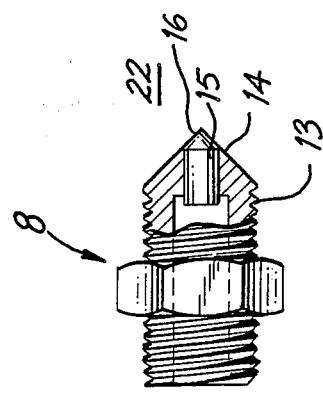
FIG. 2 is a partial cross-section view of the sensor tip according to the present invention.

Referring now to FIG. 2, a partial cross-section view of sensor tip 8, light from fiber cable 6 (see FIG. 1) is directed into optical tip 15 to the conical tip 16, where it is refracted into coating 14 at an angle dependent upon the relative indices of refraction of tip element 15 and coating 14. After passing through coating 14 to the coating/fluid interface the light is either refracted into the fluid 22 and lost or is reflected back into the coating 14, depending upon the relative indices of refraction of coating 14 and the fluid being sensed. In the absence of fluid 22 the light is reflected back into coating 14 and again undergoes refraction at the interface of coating 14 and tip element 15. Thereafter, the light travels across tip element 15 perpendicular to the original axis of the light entering tip element 15 from sensing tip optical connector 7 (See FIG. 1) and undergoes a second refraction/reflection process at the other side of the conical tip element 15. The light subsequently reflected and refracted after the second interaction, now travelling in a direction 180° relative to the light entering tip element 15 from sensing element optical connector 7, enters the return fiber of fiber cable 6 through optical connector 7.

Referring again to FIG. 1, the return beam of light travels through fiber cable 6 to bifurcation encapsulation 5, where return fiber cable 9 branches away from sending cable 4. The return beam of light continues through return fiber 9 and photodetector optical connector 10 and is incident upon photodetector 11.

The electrical output of photodetector 11 is proportional to the number of photons of the returned light incident upon the photodetector. The photodetector electrical output signal is amplified and processed by electronics module 12 in a known manner according to standard output formats. The output signals of electronics module 12 can be transmitted through electrical coupling 1 for display.

Tip element 15 and coating 14 should be constructed of materials carefully selected to have indices of refraction and a tip element bevel angle such that in the presence of the fluid to be sensed light from the sensing tip element will be refracted out into the fluid and lost. In the absence of fluid or in the presence of a second fluid having a different index of refraction the materials selected should cause light to be reflected back into coating 14, tip element 15 and fiber cable 6 to be detected by photodetector 11.

An important consideration in selecting the coating material 14 is the compatibility of that material with the fluid being sensed. That is, coating 14 should not degrade in the presence of the fluid being detected and should shed the fluid so that no fluid droplets or films form over the coating when the fluid level drops. This property is very important since fluid droplets or film can lead to false indications. Thus, as a practical matter the coating material is often selected primarily for its durability and ability to shed the fluid. As a result, the index of refraction of the coating material will often be a secondary consideration in the selection of the coating material and may not be variable by the user.

Figure 3:
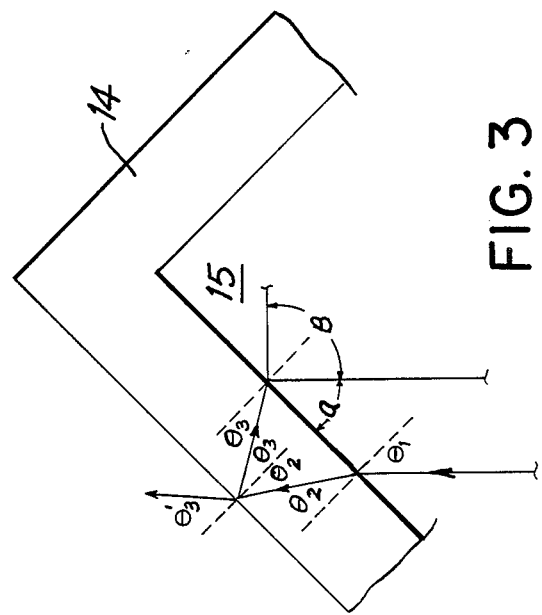
FIG. 3 is an enlarged partial cross-section view of a sensor tip according to the invention illustrating the internal angles of reflection and refraction at the tip element/coating and coating/fluid interfaces.

Thus, there are four primary variables in the sensing tip system (See FIG. 3). These are:
  $n_1$—the index of refraction of the tip element
  a—the bevel angle of the tip element
  $n_2$—the index of refraction of the coating material
  $n_3$—the index of refraction of the fluid In addition, $n_3'$ is considered to be the index of refraction in the absence of fluid. For example, when the fluid level drops and only air surrounds the sensing tip $n_3'$ equals 1.0, the index of refraction of air.

Of the four variables listed above, two are assumed to be fixed while two are variable. First, the index of refraction $n_3$ of the fluid to be sensed and the index of refraction $n_3'$ of air or a different fluid are determined by the particular application. Therefore, $n_3$ and $n_3'$ considered to be invariable. Secondly, since the sensing tip coating is chosen primarily for its properties in relation to the fluid being sensed, i.e. impermeability to the fluid and tendency to shed fluid droplets and/or film, the index of refraction $n_2$ of this material is also assumed to be invariable.

Therefore, the remaining variables which can be adjusted are the bevel angle a of the sensing tip and the index of refraction $n_1$, of the tip element.

As a practical matter, in determining the appropriate values for the sensing tip bevel angle a and index of refraction $n_1$, several factors should be considered. First, the angle of incidence of the light at the coating/fluid interface must be such that the light will be transmitted into the fluid when the fluid is present and will be internally reflected in the absence of fluid. Secondly, when internally reflected light returns from the coating/fluid interface, that light must be transmitted from the coating back into the tip element in order to avoid unnecessary loss of light due to trapping in the coating. Third, the sensing tip should be designed to accomodate a small variation in the index of refraction of the fluid, e.g. the index of refraction for JPA jet fuel, one fluid suitable for sensing, has been reported to vary over a range of about 1.40 to 1.45. Fourth, for very sensitive measurements it is contemplated that it may be necessary to take into account the Fresnel relations for transmission of light at a boundary. This fourth factor is contemplated but not discussed in detail herein. These relationships could be determined by a person of ordinary skill in the art, if necessary.

Referring to FIG. 3, in order to satisfy the first three factors discussed immediately above, the following constraints are assumed.

For a totally internally reflected beam at the coating to fluid interface:

$$\theta_2 = \theta_3.$$

When the index of refraction $n_3'$ outside the coating is 1.0, i.e. when no fluid is present:

$$\theta_2 > \sin^{-1}\left(\frac{n_3}{n_2}\right)$$

and, when the light is to be transmitted at the fluid to coating interface, i.e. when fluid is present having an index of refraction $n_3$:

$$\theta_2 > \sin^{-1}\left(\frac{n_3}{n_2}\right).$$

Moreover, in order to avoid internal light trapping at the coating/tip element interface:

$$\theta_3 > \sin^{-1}\left(\frac{n_1}{n_2}\right).$$

Noting further that $$\theta_2 = \sin^{-1}\left(\frac{n_1}{n_2} \sin \theta_1\right)$$

and that $$\theta_1 = 90° - a.$$

The internal reflection angle B (see FIG. 3) for light incident at the tip element/coating interface can be expressed $$B = 90 + \theta_4 - a.$$

Finally, since $$\theta_4 = \sin^{-1}\left(\frac{n_2}{n_1} \sin \theta_2\right)$$

by substituting according to the assumed constraints $$B = 90 + \sin^{-1}\left(\frac{n_2}{n_1} \sin\left(\sin^{-1}\left(\frac{n_1}{n_2} \sin 90° - a\right)\right)\right) - a.$$

Provided the necessary internal constraints are satisfied B can simply be expressed as:

$$B = 180° - 2a.$$

By way of example only, it has been found that a sensor according to the present invention useful for detecting standard aviation fuel known by the designation "JP4" can be constructed using a saphire sensing tip element having a bevel angle a of approximately 45° and an index of refraction on the order of 1.77, coated with a thin polytetrafluoroethylene (PTFE) coating having a relatively constant index of refraction of about 2.1. This sensor tip has been found to be useful for sensing the presence of fluids having an index of refraction from 1.1 to 2.1 and has been found to be particularly desirable for sensing jet fuels having an index of refraction from 1.42 to 1.46, depending upon the age of the fuel.

Of course, it is contemplated that the sensing tip could be made from any optical quality glass or other material having an appropriate index of refraction and bevel angle. It is also contemplated that coatings other than PTFE may prove to be suitable depending upon the particular fluid sensing application.

Other specific constructions presently contemplated but not yet constructed are set forth in Table I. Table I lists two additional tip element selections for similar sensing conditions.

TABLE I

| Tip element material | Glass | High lead content glass |
|---|---|---|
| Tip element index of refraction $n_1$ | 1.46 | 1.9 |
| Tip bevel angle a | 45° | 45° |
| Coating material | PTFE | PTFE |
| Coating material index of refraction | 2.1 | 2.1 |
| Fluid index of refraction $n_3$ | 1.42 | 1.42 |
| $n_3$ (air) | 1.0 | 1.0 |
| B | 90° | 90° |

Using the formulae set forth above, it can be shown that the tip materials listed in Table I should satisfy all internal constraints. That is, when these tip materials are used, light should be transmitted to the fluid when the fluid is present (i.e. $n_3 = 1.42$) or totally internally reflected for detection when the fluid is not present (i.e. $n_3 = 1.0$.

It can also be shown using the above formulae that under the same conditions shown in Table I, a hard plastic tip element having an index of refraction $n_1$ equal to 1.3 will not satisfy the necessary internal constraints. That is, should a hard plastic tip element be used under these conditions it can be shown that no total internal reflection would occur either in the presence of a fluid having $n_3 = 1.42$ or in the presence of air having $n_3 = 1.0$. Thus, a hard plastic tip element would not be satisfactory for this particular application since no distinction could be noted between the presence or absence of the fluid.

In this regard, when the coating material is PTFE having $n_2 = 2.1$ and the tip element bevel angle $a = 45°$, it can be shown that for any particular fluid and tip element material the exit angle $O_3$ must be maintained below 90° in order to distinguish the fluid from air.

When $O_3$ reaches 90° total internal reflection will occur and no distinction can be made.

It has also been found that by varying the sensitivity of the detector and processing electronics the sensor tip according to the invention can be used to sense the presence of water having an index of refraction of 1.33. Thus, it is further contemplated that when two miscible liquids having distinct indices of refraction are present a distinction between such fluids can be made. Indeed, it is believed that an estimate of the relative percentage of such miscible fluids relative to the total fluid can be made using an analog display. That is, where only one fluid is present a certain light level indication would be expected and in the presence of only the second fluid a distinct reading would be expected. In the presence of a mixture of the two fluids an analog reading somewhere between those two values can be expected.

Practice with the invention has also revealed that a small amount of light entering tip element 15 from sensing tip optical connector 7 is always dispersed over an emission cone depending upon the effective numerical aperture of the sending fiber(s). In other words, not all light entering tip element 15 is on axis. Consequently, some light is always returned to photodetector 11 based only upon internal reflections of tip element 15 (see FIG. 3, specifically reflection angle B), which light has not experienced refraction or reflection at the coating/liquid interface. Advantageously, this low-level of constant return energy is detected by photodetector 11 and can be used to provide a fail-safe monitor of the fluid sensor. The electronics module can be arranged to constantly monitor the presence of this low-level constant return beam and, in the absence of this constant signal, trigger a status line output indicating a system failure. Failure at any point in the emitter, fiber cables, tip element or photodetector will result in an insufficient constant return beam and will trigger the status alert.

Thus, it will be apparent that the fluid sensor according to the present invention advantageously provides safe, accurate fluid sensing in the presence of volatile liquids by positioning all electronics which might cause an igniting spark away from the sensing location. Furthermore, the present fluid sensor reduces the likelihood of false indications due to the formation of residual fluid film or droplets on the sensor and includes desirable fiber optic technology which is capable of operating at relatively long transmission distances without signal interference. Moreover, the fluid sensor according to the present invention is remarkably compact and light weight and includes the capability to self-monitor sensor performance.

To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. An optical fluid sensor comprising:
   a light emitter;
   a sensing tip element having at least one sensing surface;
   a sensing tip coating disposed over said sensing surface between said sensing tip element and the fluid to be sensed, such that the outer surface of said coating away from said tip element contacts the fluid when present, said coating being impermeable to the fluid and resistant to formation of residual fluid deposits;
   first optical fiber means connected to said light emitter and to said sensing tip element for transmitting light from said light emitter to said sensing tip;
   second optical fiber means connected to said sensing tip and to a photodetector, such that light emitted from said emitter is conveyed by said first optical fiber means to said sensing tip element, said light being substantially totally internally reflected in a first fluid condition and conveyed by said second optical fiber means to said photodetector for detection, said light being substantially completely refracted through said sensing surface and said coating in a second fluid condition; and
   electronic processing means for processing and displaying information from said photodetector.

2. The optical fluid sensor according to claim 1 wherein said electronic processing means monitors low level light continuously received by said photodetector from said sensing tip to provide a self-monitoring system capable of indicating system failure.

3. The sensor according to claim 1 wherein said sensing tip element has a substantially conical configuration.

4. The sensor according to claim 3 wherein:
   $n_1$ = the sensing tip element index of refraction,
   a = the sensing tip bevel angle, and
   $n_2$ = the coating index of refraction, whereby the sensing tip element internal angle of reflection B is defined by the equation:

$$B = 90 + \text{Sin}^{-1}\left(\frac{n_2}{n_1} \sin\left(\sin^{-1}\left(\frac{n_1}{n_2} \sin 90° - a\right)\right)\right) - a$$

5. The sensor according to claim 3 wherein said sensing tip element has a bevel angle a equal to 45°.

6. The sensor according to claim 4 wherein said coating material is selected and said sensing tip is configured and dimensioned so that, in the presence of a fluid mixture consisting of at lesat two miscible fluids, a first portion of said light proportional to the amount of one of said miscible fluids is transmitted into said fluid and lost and a second portion of said light proportional to the remainder of said fluid mixture is internally reflected and refracted to be detected by said photodetector.

7. The sensor according to claim 5 wherein said coating is a thin coating composed of polytetrafluoroethylene.

8. The sensor according to claim 7 wherein said sensing tip element is composed of saphire.

9. A method of sensing fluid comprising:
   providing a light emitter;
   providing a photodetector for producing a signal in response to light incident thereon;
   providing a sensor tip in optical communication with said light emitter and said photodetector, said sensor tip including a substantially conical sensing tip element and a sensing tip coating over said sensing tip element to present a coated sensing tip surface in contact with the fluid to be sensed, said sensing tip coating being selected to be impermeable to the fluid to be sensed and resistant to the formation of fluid film of droplets thereon, said sensing tip element being selected from a material having an index of refraction $n_1$ and configured to have an internal angle of reflection B according to the formula $$B = 90 + \operatorname{Sin}^{-1}\left(\frac{n_2}{n_1} \sin\left(\sin^{-1}\left(\frac{n_1}{n_2} \sin 90° - a\right)\right)\right) - a$$

where
$n_2$ = the coating index of refration, and
a = the sensing tip bevel angle;
providing electronic processing means connected to said photodetector for amplifying and displaying the signal from said photodetector;
activating said light emitter to transmit light to said sensor tip, said light being transmitted through said sensor tip element to the tip element/coating interface, said light being refracted through said coating to the coating/fluid interface, said light at said coating/fluid interface being refracted into the fluid and lost when the fluid is present or reflected back into said coating in the absense of the fluid, said light reflected back into said coating in the absence of fluid being internally refracted and reflected within said coating and said tip element and directed to said photodetector to produce a signal processed by said electronic processing means to provide a display.

10. The method according to claim 9 wherein said coating material is selected and said sensing tip element is configured and dimensioned so that, in the presence of a fluid mixture consisting of at least two miscible fluids, a first portion of said light proportional to the amount of one of said miscible fluids is transmitted into said fluid and lost and a second portion of said light is internally reflected and refracted to said photodetector.

11. The method according to claim 9 wherein said sensing tip element is a conical saphire tip having a bevel angle of approximately 45°.

12. The method according to claim 11 wherein said coating is a thin polytetrafluoroethylene coating.

13. An optical fluid sensor tip comprising:
a substantially conical sensing tip element having at least one sensing surface, an index of refraction $n_1$, a bevel angle a, and an internal angle of reflection B;
a sensing tip element coating over said sensing surface and in contact with the fluid, said coating being substantially impermeable to the fluid and having an index of refraction $n_2$, whereby $$B = 90 + \operatorname{Sin}^{-1}\left(\frac{n_2}{n_1} \sin\left(\sin^{-1}\left(\frac{n_1}{n_2} \sin 90° - a\right)\right)\right) - a$$

14. The optical fluid sensor tip according to claim 13 wherein said sensing tip element is saphire and said bevel angle a equals 45°.

15. The optical fluid sensor according to claim 14 wherein said coating is a thin polytetrafluoroethylene coating.

* * * * *

UNITED STATES PATENT AND TRADEMARK OFFICE
CERTIFICATE OF CORRECTION

PATENT NO. : 4,764,671
DATED : August 16, 1988
INVENTOR(S) : Eric D. Park

Page 1 of 2

It is certified that error appears in the above-identified patent and that said Letters Patent is hereby corrected as shown below:

In the Abstract, line 16 "Fluidand" should read --fluid and--

Column 2, line 17, "non-visibe" should read --non-visible--

Column 4, line 52, after $n_3'$ insert --are--

Column 5, line 29, "$n_3$" should read --$n_3'$--

Cloumn 5, line 38, "$>$" should read --$<$--

Column 5, line 46, "$>$" should read --$<$--

Column 5, line 59, after "expressed" insert --as--

Column 6, line 42, "$n_3(air)$" should read --$n_3'$ (air)--

Column 6, line 51, "$n_3$" should read --$n_3'$--

Column 6, line 59, "$n_3$" should read --$n_3'$--

Column 6, line 67, "$O_3$" should read --$O_3'$--

UNITED STATES PATENT AND TRADEMARK OFFICE
CERTIFICATE OF CORRECTION

PATENT NO. : 4,764,671
DATED : August 16, 1988
INVENTOR(S) : Eric D. Park

It is certified that error appears in the above-identified patent and that said Letters Patent is hereby corrected as shown below:

Column 7, line 1, "$O_3$" should read -- $O_3'$ --.

Signed and Sealed this

Third Day of January, 1989

*Attest:*

DONALD J. QUIGG

*Attesting Officer*     *Commissioner of Patents and Trademarks*